(12) United States Patent
Rubin et al.

(10) Patent No.: US 12,430,747 B2
(45) Date of Patent: Sep. 30, 2025

(54) INSPECTING A PRODUCT MADE BY ADDITIVE MANUFACTURING

(71) Applicant: Nano Dimension Technologies Ltd, Ness Ziona (IL)

(72) Inventors: Eri Rubin, Kibbutz Ma'ale Ha'hamisha (IL); Yotam Raz, Tel Aviv (IL); Itay Mosafi, Tel Aviv (IL); Marina Izmailov, Rehovot (IL); Katia Huri, Givatayim (IL); Eli David, Tel Aviv (IL)

(73) Assignee: NANO DIMENSION TECHNOLOGIES, LTD., Ness Ziona (IL)

(*) Notice: Subject to any disclaimer, the term of this patent is extended or adjusted under 35 U.S.C. 154(b) by 380 days.

(21) Appl. No.: 18/101,692

(22) Filed: Jan. 26, 2023

(65) Prior Publication Data
US 2024/0257333 A1    Aug. 1, 2024

(51) Int. Cl.
*G06K 9/00* (2022.01)
*G06T 7/00* (2017.01)

(52) U.S. Cl.
CPC ............ *G06T 7/0006* (2013.01); *G06T 7/001* (2013.01); *G06T 2207/20081* (2013.01); *G06T 2207/30144* (2013.01)

(58) Field of Classification Search
CPC ............. G06T 7/0006; G06T 7/001; G06T 2207/20081; G06T 2207/30144
See application file for complete search history.

(56) References Cited

U.S. PATENT DOCUMENTS

| | | | |
|---|---|---|---|
| 7,894,927 B2* | 2/2011 | Funk | H01L 22/12 703/2 |
| 10,824,134 B2* | 11/2020 | Schwartz | B33Y 50/02 |
| 10,857,738 B2* | 12/2020 | Yun | B22F 12/17 |
| 11,084,225 B2* | 8/2021 | Pinskiy | G06V 10/764 |
| 11,455,528 B2* | 9/2022 | Ambikapathi | G06N 3/045 |
| 12,169,397 B2* | 12/2024 | Cetinkaya | B22F 10/85 |
| 12,265,377 B2* | 4/2025 | Panda | G05B 19/4155 |

(Continued)

FOREIGN PATENT DOCUMENTS

| | | | | |
|---|---|---|---|---|
| CN | 111007073 | | 4/2020 | |
| KR | 102266605 B1* | | 6/2021 | ......... G01R 31/2865 |
| WO | WO-2023249657 A1* | | 12/2023 | ........... B29C 64/393 |

OTHER PUBLICATIONS

International Search Report and Written Opinion for PCT Application No. PCT/IL2024/050082 dated Apr. 4, 2024.

*Primary Examiner* — Shervin K Nakhjavan
(74) *Attorney, Agent, or Firm* — PEARL COHEN ZEDEK LATZER BARATZ LLP

(57) ABSTRACT

Methods of inspecting a product made by additive manufacturing (AM) of multiple layers, computer program products and inspection modules for AM systems are provided. An augmented file is derived from a design file including layer data used to produce the product by AM. For each design layer, the augmented file includes the layer data for the design layer and weighted layer data for design layers beneath the design layer. A machine learning (ML) algorithm (trained on previous images and augmented files) is applied with respect to the derived augmented file onto received optical inspection images of the product during the AM process to detect production errors.

12 Claims, 5 Drawing Sheets

(56) References Cited

U.S. PATENT DOCUMENTS

| | | |
|---|---|---|
| 2022/0042924 A1 | 2/2022 | Beckett et al. |
| 2022/0292660 A1* | 9/2022 | Wang .................... G06T 11/00 |
| 2022/0342316 A1* | 10/2022 | Kooiman ............ G03F 7/70625 |
| 2023/0089330 A1* | 3/2023 | Cella .................. G06Q 10/0633 |
| 2023/0342908 A1 | 10/2023 | Jain et al. |

* cited by examiner

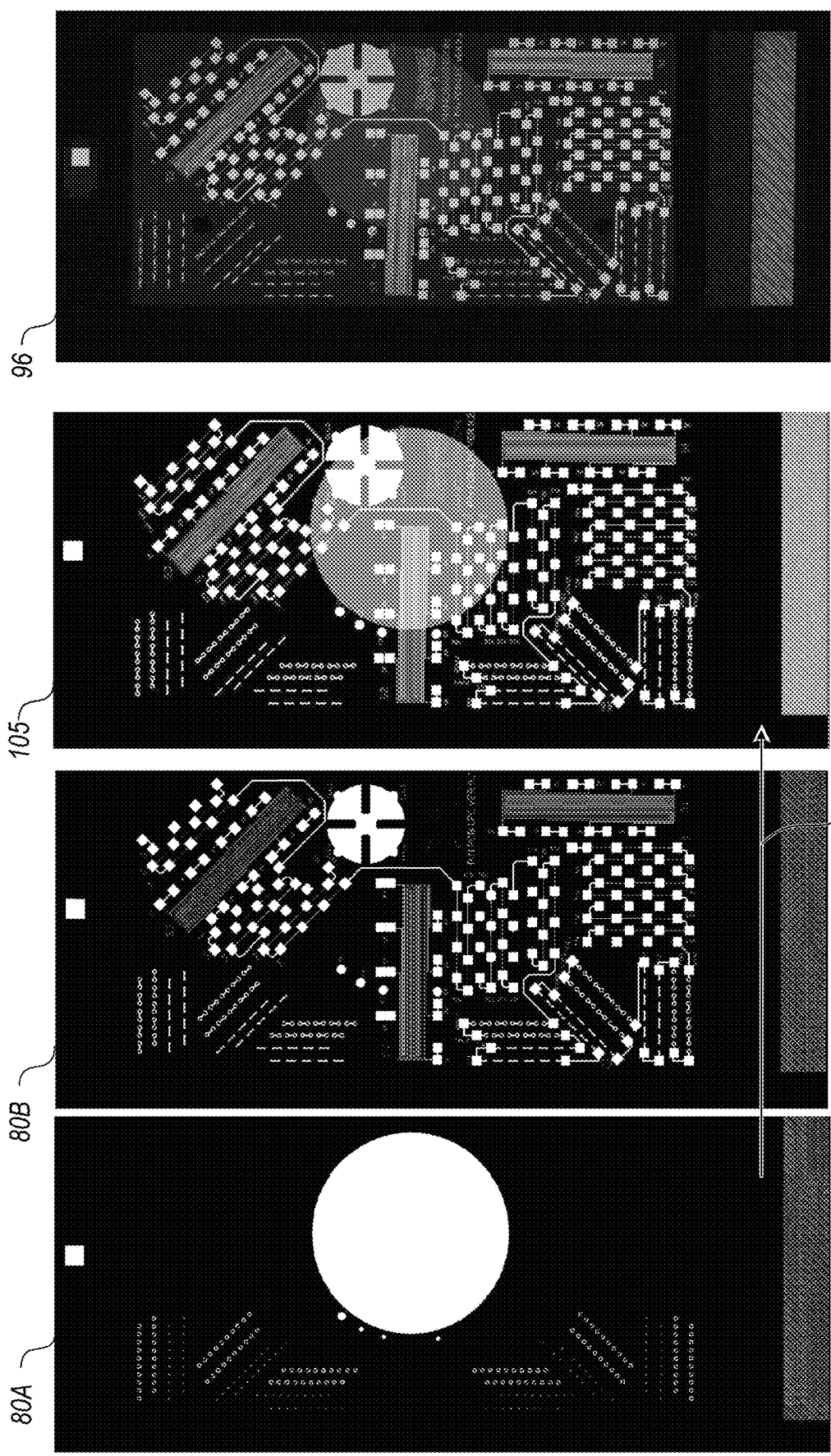

INSPECTING A PRODUCT MADE BY ADDITIVE MANUFACTURING

BACKGROUND OF THE INVENTION

1. Technical Field

The present invention relates to the field of additive manufacturing, and more particularly, to additive manufacturing of objects.

2. Discussion of Related Art

In additive manufacturing (AM), consecutive layers which may be composed of different materials are deposited on a substrate and consecutively upon previous layers, building up a product layer-by-layer, based on layers in a design file that specify the elements and materials in each layer.

SUMMARY OF THE INVENTION

The following is a simplified summary providing an initial understanding of the invention. The summary does not necessarily identify key elements nor limit the scope of the invention, but merely serves as an introduction to the following description.

One aspect of the present invention provides a method of inspecting a product made by additive manufacturing (AM) of multiple layers, the method comprising: deriving an augmented file, from a design file including layer data used to produce the product by AM, wherein for each design layer, the augmented file includes the layer data for said design layer and weighted layer data for design layers beneath said design layer, and applying a machine learning (ML) algorithm with respect to the derived augmented file—onto received optical inspection images of the product during the AM process to detect production errors, wherein the ML algorithm is trained using a plurality of augmented files and corresponding optical inspection images—to adjust the weights so that production errors in each produced layer are detected irrespective of signals from the produced layers beneath said produced layer.

One aspect of the present invention provides a computer program product comprising a computer readable storage medium having computer readable program embodied therewith, the computer readable program comprising: computer readable program configured to derive an augmented file, from a design file including layer data used to produce a product made by additive manufacturing (AM) of multiple layers, wherein for each design layer, the augmented file includes the layer data for said design layer and weighted layer data for design layers beneath said design layer, and computer readable program configured to apply a machine learning (ML) algorithm with respect to the derived augmented file—onto received optical inspection images of the product during the AM process to detect production errors, wherein the ML algorithm is trained using a plurality of augmented files and corresponding optical inspection images—to adjust the weights so that production errors in each produced layer are detected irrespective of signals from the produced layers beneath said produced layer.

One aspect of the present invention provides a computer program product comprising a computer readable storage medium having computer readable program embodied therewith, the computer readable program comprising: computer readable program configured to apply a machine learning (ML) algorithm with respect to a derived augmented file, the augmented file derived from a design file including layer data used to produce a product made by additive manufacturing (AM) of multiple layers, wherein for each design layer, the augmented file includes the layer data for said design layer and weighted layer data for design layers beneath said design layer—onto received optical inspection images of the product during the AM process to detect production errors, wherein the ML algorithm is trained using a plurality of augmented files and corresponding optical inspection images—to adjust the weights so that production errors in each produced layer are detected irrespective of signals from the produced layers beneath said produced layer.

These, additional, and/or other aspects and/or advantages of the present invention are set forth in the detailed description which follows; possibly inferable from the detailed description; and/or learnable by practice of the present invention.

BRIEF DESCRIPTION OF THE DRAWINGS

For a better understanding of embodiments of the invention and to show how the same may be carried into effect, reference will now be made, purely by way of example, to the accompanying drawings in which like numerals designate corresponding elements or sections throughout. In the accompanying drawings:

FIG. 2D provides an example of deriving the augmented file from design layer, and FIG. 2E provides the corresponding inspection image, according to some embodiments of the invention.

Figure 1:
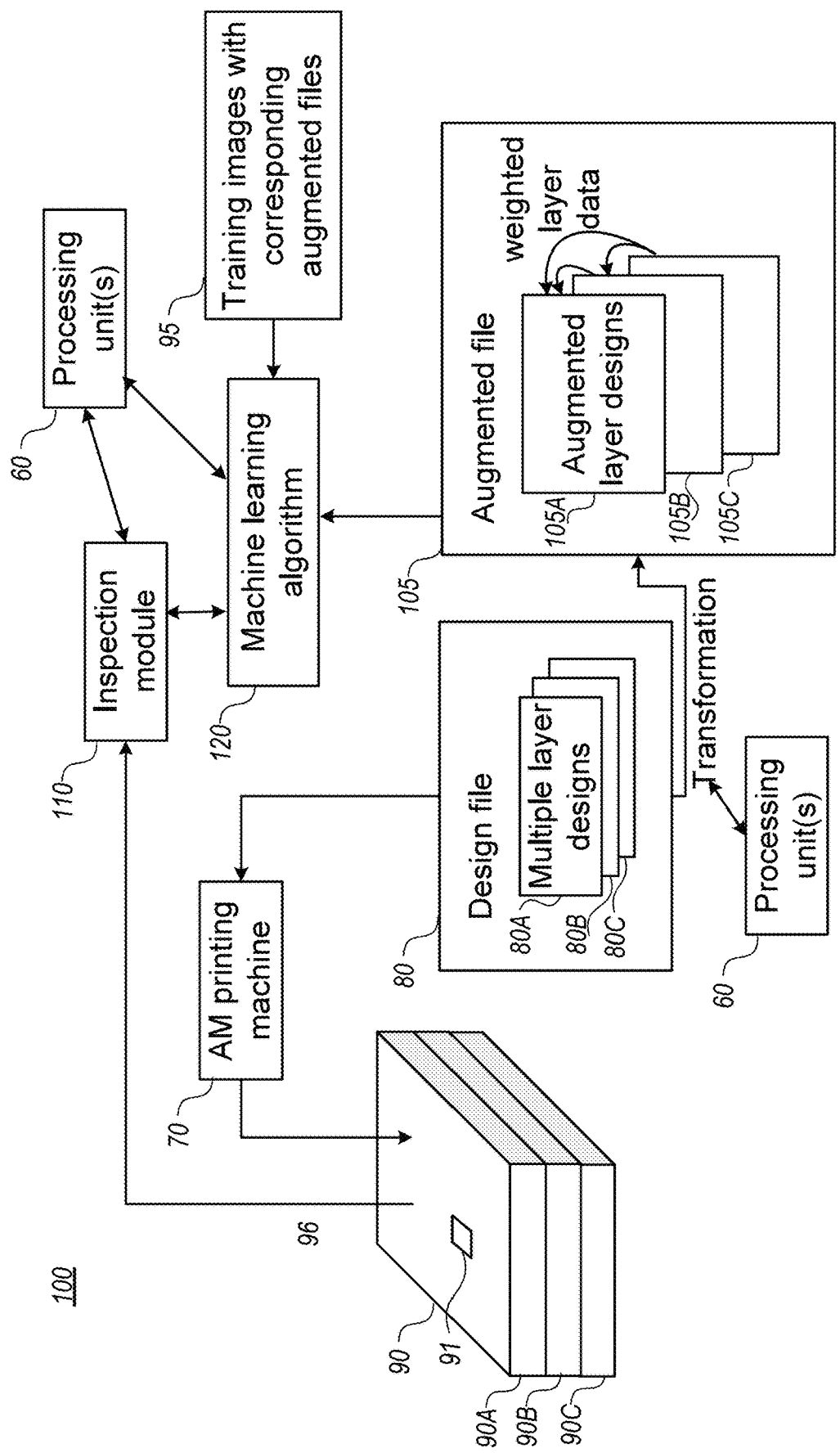
FIG. 1 is a high-level schematic block diagram of an additive manufacturing (AM) system including an inspection module, according to some embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following description, various aspects of the present invention are described. For purposes of explanation, specific configurations and details are set forth in order to provide a thorough understanding of the present invention. However, it will also be apparent to one skilled in the art that the present invention may be practiced without the specific details presented herein. Furthermore, well known features may have been omitted or simplified in order not to obscure the present invention. With specific reference to the drawings, it is stressed that the particulars shown are by way of example and for purposes of illustrative discussion of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Before at least one embodiment of the invention is explained in detail, it is to be understood that the invention is not limited in its application to the details of construction and the arrangement of the components set forth in the following description or illustrated in the drawings. The invention is applicable to other embodiments that may be practiced or carried out in various ways as well as to combinations of the disclosed embodiments. Also, it is to be understood that the phraseology and terminology employed herein are for the purpose of description and should not be regarded as limiting.

Unless specifically stated otherwise, as apparent from the following discussions, it is appreciated that throughout the specification discussions utilizing terms such as "processing", "computing", "calculating", "determining", "enhancing", "deriving" or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

Embodiments of the present invention provide efficient and economical methods and mechanisms for inspecting products made by additive manufacturing (AM) and thereby provide improvements to the technological field of 3D printing. Methods of inspecting a product made by additive manufacturing (AM) of multiple layers, computer program products and inspection modules for AM systems are provided. An augmented file is derived, from a design file including layer data used to produce the product by AM. For each design layer, the augmented file includes the layer data for the design layer and weighted layer data for design layers beneath the design layer. A machine learning (ML) algorithm (trained on previous images and augmented files) is applied with respect to the derived augmented file onto received optical inspection images of the product during the AM process to detect production errors.

In additive manufacturing (AM) of electronic devices, consecutive layers are deposited on a substrate, each layer including patterned conductive material and partly-transparent insulating material. Upon inspection of the top layer of the device that is being produced, elements from lower layers (beneath the top layer) are visible through the deposited partly-transparent insulating material—posing a problem to reliable detect and inspect the conductive material patterns of the top layer. To solve this problem, augmented CAD files are derived for the purpose of inspection. These files include, in addition to the patterns of the top layer, also patterns of lower layers that are coded with respect to the corresponding depth of the lower layer. For example, elements from lower layers may be represented with decreasing levels of darkness and/or contrast, to enable the inspection algorithm to distinguish between signals from different layers and correlate elements from different layers with their respective optical signals.

Deep learning algorithms may be used to relate the augmented CAD files to the optical inspection images of the device that is being produced, to detect errors in production without interference of optical signals from deeper layers. Moreover, disclosed algorithms may be used to detect shifting of openings such as vias that go through two or more layers.

Disclosed may be used to inspect various produced objects, such as AM-produced semi-transparent products and models, in which deeper layers are visible during the inspection of each produced top layer, AM-produced products and models that include openings (e.g., holes, tunnels, or other void spaces) that go through multiple layers so that lower layers are visible during the inspection of respective top layers, by design and/or due to unintended shifts in any of the layers, products and objects with at least one semi-transparent portion, electronic devices that include patterned conductive material and semi-transparent insulating material and/or openings such as vias that go through multiple layers, as well as non-conductive models that include semi-transparent parts and/or openings.

FIG. 1 is a high-level schematic block diagram of an additive manufacturing (AM) system 100 including an inspection module 110, according to some embodiments of the invention. AM system 100 includes an AM printing machine 70 configured to produce a product 90 layer-by-layer (the non-limiting example illustrates schematically three layers 90A, 90B, 90C) from a design file 80 that includes the layer data (denoted schematically, in a non-limiting manner, 80A, 80B, 80C, respectively). AM system 100 further comprises one or more processing units 60 (see FIG. 3 for more details) that may be at least partly implemented within AM printing machine 70, within inspection module 110 and/or be used as stand-alone modules. An augmented file (also termed composite raster herein) 105 is derived from design file 80 (e.g., by one or more processing units 60) to include corresponding augmented layer designs (denoted schematically, in a non-limiting manner, 105A, 105B, 105C, respectively), wherein for each design layer 80A, 80B, 80C, augmented file 105 includes the layer data for the respective design layer as well as weighted layer data for design layers beneath the respective design layer.

For example, in the non-limiting example illustrated in FIG. 1, weighted layer data from bottom layer 105C is used to augment layer data 105B above it, and weighted layer data from both bottom layer 105C and layer data 105B above it are used to augment top layer 105A, with different weights for each layer. The number of layers used to augment each layer above them may vary, e.g., all layers below any specific layer may be used, a set number of layers below each layer may be used, or a varying number of layers may be used for each respective layer above them, e.g., depending on the complexity, information content or specific details of each of the layers. For example, all layers may be used to augment any layer above them, with none, one or more of the weights being set to zero. Clearly the three illustrated layers are mere for explanation purposes, while typical objects 90, design files 80 and augmented files 105 have more layers, e.g., up to ten layers, a few or several tens of layers, or a few hundreds of layers.

Figure 2A:
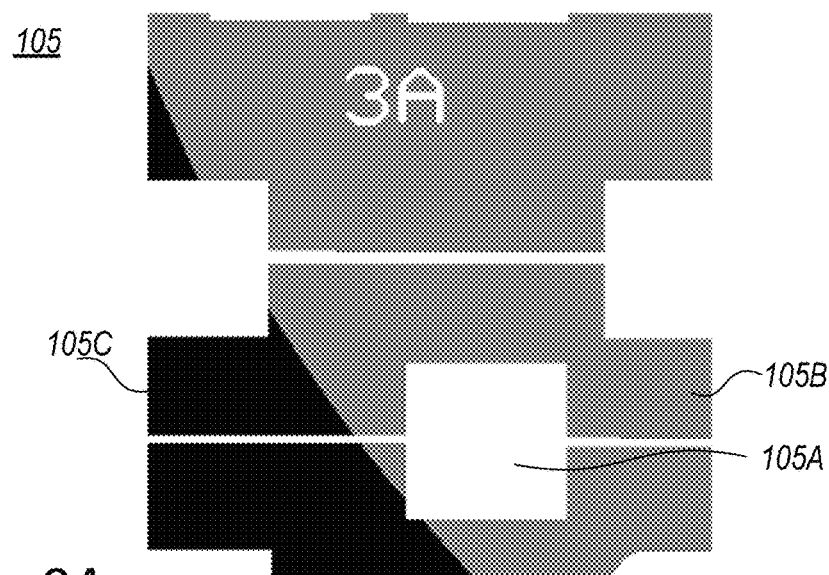
FIGS. 2A-2C provided illustrations of non-limiting examples for augmented files, according to some embodiments of the invention.
Figure 2B:
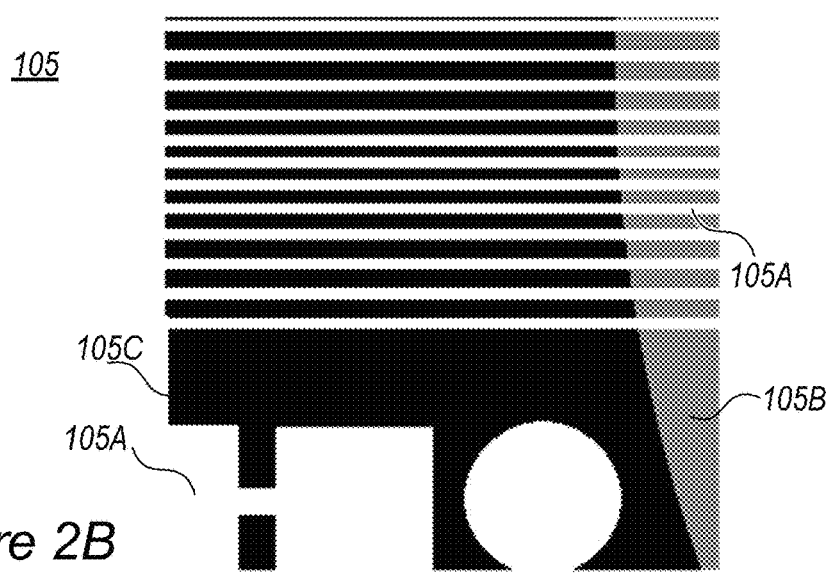
Figure 2C:
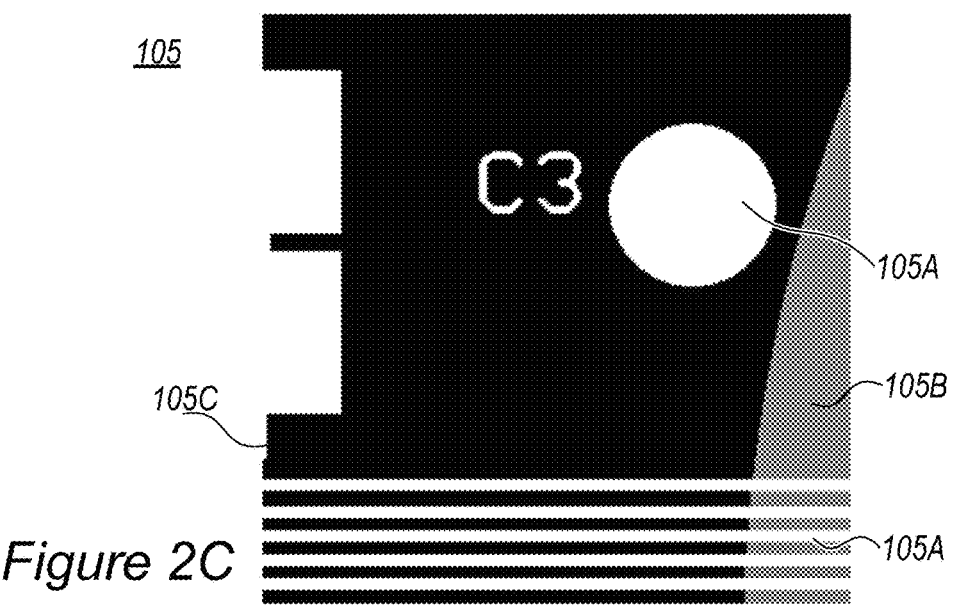
Figure 2F:
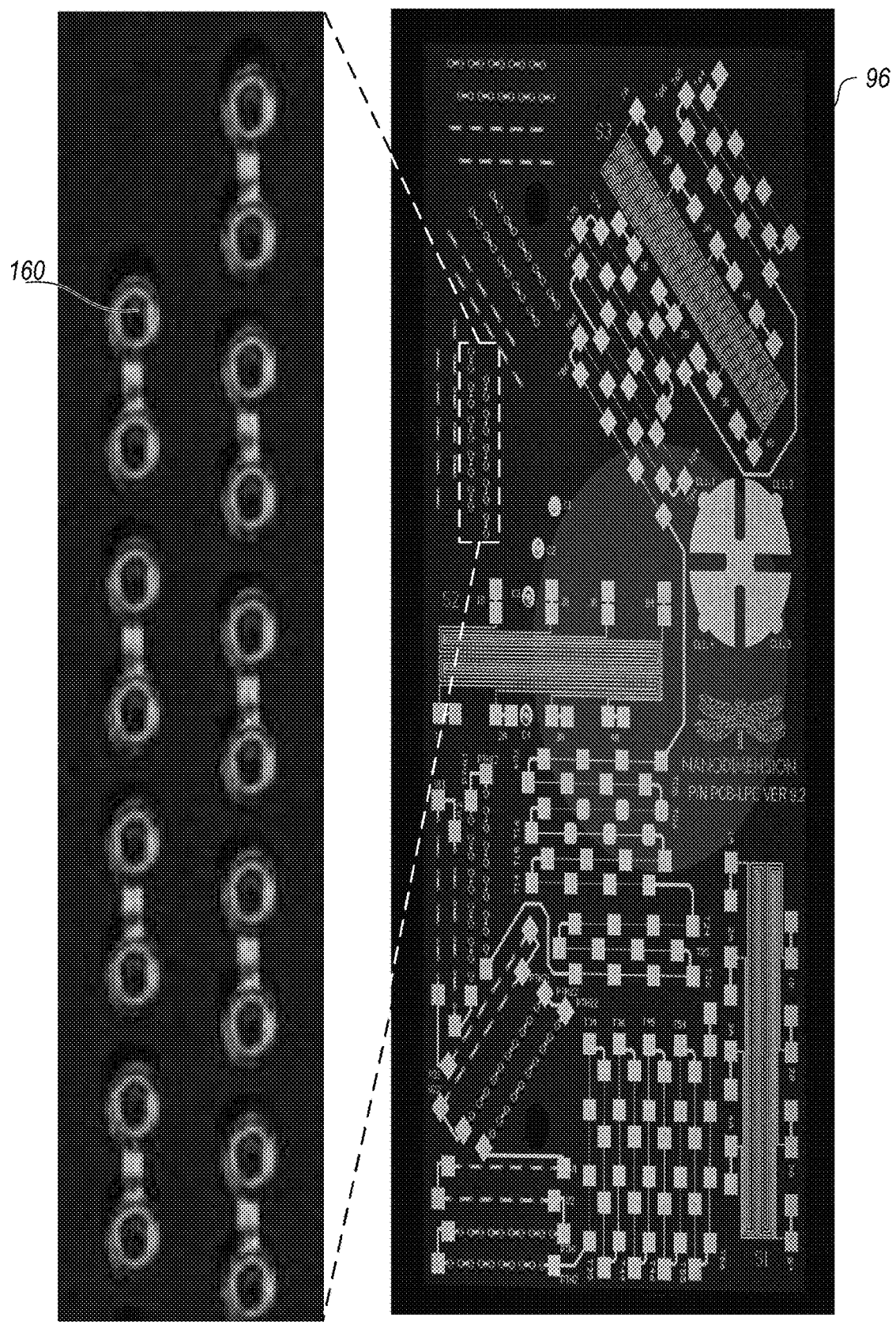
FIG. 2F provides an example of openings (vias), according to some embodiments of the invention.

FIGS. 2A-2C provide illustrations of non-limiting examples for augmented files (composite rasters) 105, according to some embodiments of the invention. In all three illustrations, top layer 105A (in white) is augmented by layer data 105B below it (in gray), and bottom data layer 105C below it (in black). FIG. 2D provides another example of deriving augmented file 105 from design layer 80A, 80B (stage 210 in method 200 illustrated in FIG. 3), according to some embodiments of the invention; and FIG. 2E provides inspection image 96 that corresponds to product 90 printed using these design layers and that is inspected with respect to augmented file 105 illustrated in FIG. 2D, according to some embodiments of the invention. FIG. 2F provides an example of openings (vias) 106, according to some embodiments of the invention.

It is noted the FIGS. 2D-2F illustrate a test design, and so it does not necessarily represent functional circuitry. FIGS. 2D-2F provide an example for implementing disclosed inspection methods and modules. In this and similar test designs, disclosed methods reduced the time required to inspect the product be a factor between 2 and 5 (shorter times achieved using the composite raster versus previously practiced extraction of keypoints for each layer), depending on the number of layers. Additionally, the registration of the images to the raster was improved by 10-20% (with respect to the number of images that are registered successfully using the disclosed composite raster versus registration of each layer).

In certain embodiments, disclosed algorithms may be used to detect shifting of openings 91 such as vias (openings, such as round holes with no material content going through two or more layers, and are surrounded by printed material). The shifting may be detected according to weighted layer data from lower layers that is visible at top layer 105A at locations designed as openings 106 (e.g., multiple vias 160 are illustrated in FIG. 2F), such as vias or any vertical elements in the 3D print, that are printed and appear in multiple horizontal layers.

A machine learning (ML) algorithm 120 may be trained using relate sets of received optical inspection images for various produced objects with the corresponding augmented files for these objects (denoted schematically 95)—to optimize the weights and to reliably detect defects in the produced objects, e.g., using deep learning methodologies. Consecutively, ML algorithm 120 may be applied to received optical inspection images 96 (see FIG. 1 and example in FIG. 2E) of product 90 during its production stages and with respect to derived augmented file 105 to detect production errors during the AM process.

In certain embodiments, top layer 90A (as the current layer, see FIG. 1) may have little information (include few details, be very sparse) and the layers underneath (e.g., layers 90B, 90C, etc.—the previous layers) may provide more information, so that in the inspection image, most of the information comes from the previous layers. In such cases, using augmented file 105 (as the composite raster that is compared to the inspection image) represents the inspection image much more clearly and may provide more useful information, than using only the top layer design 80A for inspection, as in the prior art.

Figure 3:
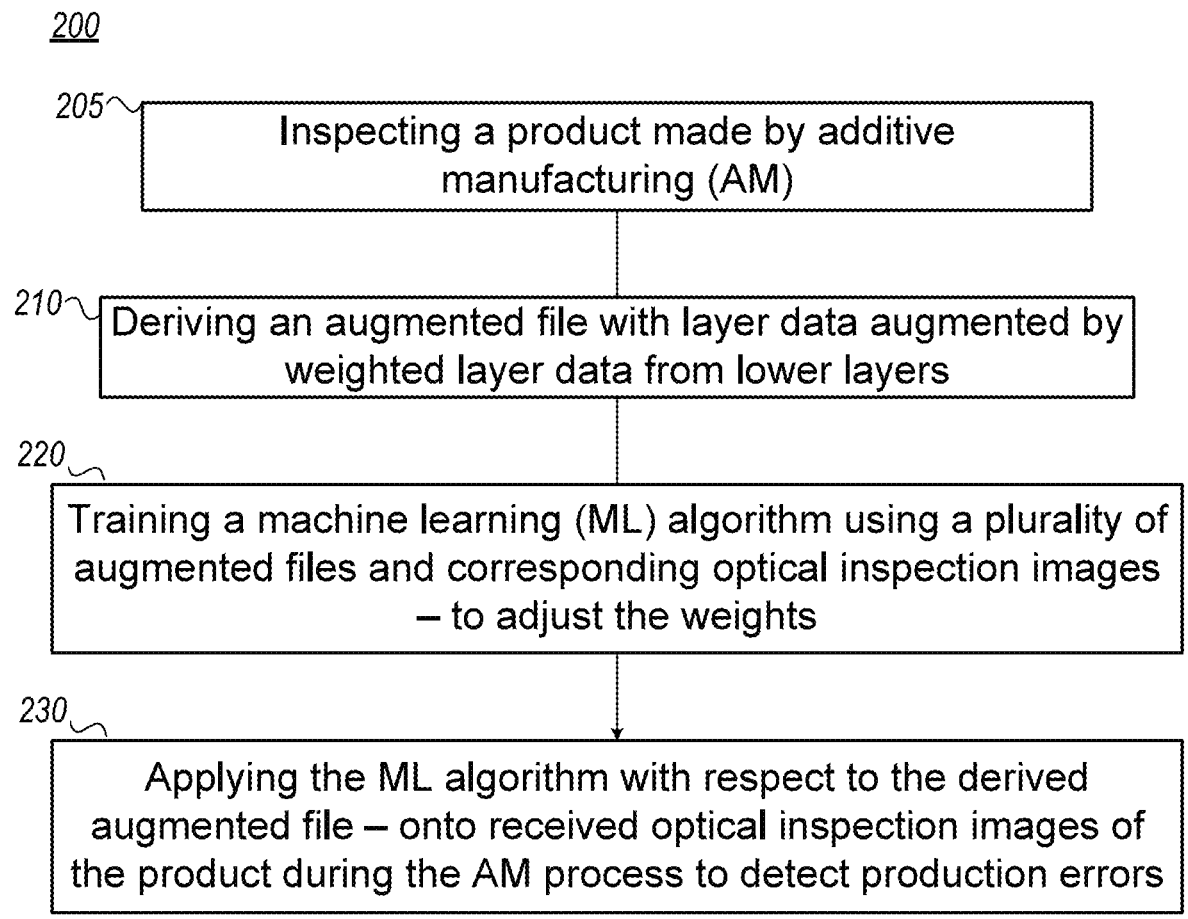
FIG. 3 is a high-level flowchart illustrating a method of inspecting a product made by additive manufacturing (AM) of multiple layers, according to some embodiments of the invention.

FIG. 3 is a high-level flowchart illustrating a method 200 of inspecting a product made by additive manufacturing (AM) of multiple layers, according to some embodiments of the invention. The method stages may be carried out with respect to AM system 100 and/or inspection module 110 described above, which may optionally be configured to implement method 200. Method 200 may be at least partially implemented by at least one computer processor 60 (see FIG. 4), e.g., in inspection module 110. Certain embodiments comprise computer program products comprising a computer readable storage medium having computer readable program embodied therewith and configured to carry out the relevant stages of method 200. Method 200 may comprise the following stages, irrespective of their order.

Method 200 of inspecting a product made by AM (stage 205) may comprise deriving an augmented file (stage 210), from a design file including layer data used to produce the product by AM, wherein for each design layer, the augmented file includes the layer data for said design layer and weighted layer data for design layers beneath said design layer, and applying a machine learning (ML) algorithm with respect to the derived augmented file (stage 230)—onto received optical inspection images of the product during the AM process to detect production errors. Method 200 may further comprise training the ML algorithm (stage 220), e.g., using a plurality of augmented files and corresponding optical inspection images—to adjust the weights so that production errors in each produced layer are detected irrespective of signals from the produced layers beneath said produced layer. Alternatively or complementarily, method 200 may utilized a pre-trained ML algorithm.

In various embodiments, the ML algorithm may comprise a deep learning algorithm. The weights may decrease with designed layer depth to distinguish between the layers and to correspond to the higher optical prominence of higher layers (beneath the inspected layer). For example, the augmented file may include the weighted layer data with decreasing darkness and/or contrast for design layers deeper below the inspected design layer. Examples for products include various models and objects that include openings going through two or more of the layers and/or having semi-transparent portions, such as electronic devices that include patterned conductive material and semi-transparent insulating material and/or non-conductive semi-transparent models.

Certain embodiments comprise a computer program product comprising a computer readable storage medium having computer readable program embodied therewith, the computer readable program comprising: computer readable program configured to derive an augmented file, from a design file including layer data used to produce a product made by additive manufacturing (AM) of multiple layers, wherein for each design layer, the augmented file includes the layer data for said design layer and weighted layer data for design layers beneath said design layer, and computer readable program configured to apply a machine learning (ML) algorithm with respect to the derived augmented file—onto received optical inspection images of the product during the AM process to detect production errors, wherein the ML algorithm is trained using a plurality of augmented files and corresponding optical inspection images—to adjust the weights so that production errors in each produced layer are detected irrespective of signals from the produced layers beneath said produced layer.

Certain embodiments comprise a computer program product comprising a computer readable storage medium having computer readable program embodied therewith, the computer readable program comprising: computer readable program configured to apply a machine learning (ML) algorithm with respect to a derived augmented file, the augmented file derived from a design file including layer data used to produce a product made by additive manufacturing (AM) of multiple layers, wherein for each design layer, the augmented file includes the layer data for said design layer and weighted layer data for design layers beneath said design layer—onto received optical inspection images of the product during the AM process to detect production errors, wherein the ML algorithm is trained using a plurality of augmented files and corresponding optical inspection images—to adjust the weights so that production errors in each produced layer are detected irrespective of signals from the produced layers beneath said produced layer.

Certain embodiments comprise inspection module 110 in AM system 100, which comprises any of the disclosed computer program product or parts thereof.

Figure 4:
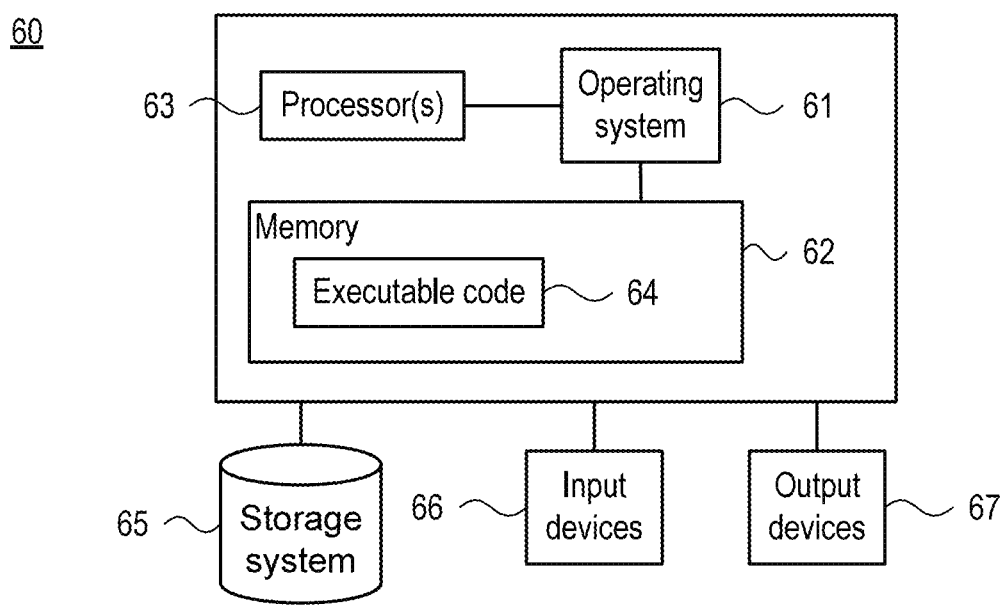
FIG. 4 is a high-level block diagram of exemplary controllers, which may be used with embodiments of the present invention.

FIG. 4 is a high-level block diagram of exemplary controllers 60, which may be used with embodiments of the present invention. Controller(s) 60 may include one or more controller or processor 63 that may be or include, for example, one or more central processing unit processor(s) (CPU), one or more Graphics Processing Unit(s) (GPU or general-purpose GPU—GPGPU), a chip or any suitable computing or computational device, an operating system 61, a memory 62, a storage 65, input devices 66 and output devices 67.

Operating system 61 may be or may include any code segment designed and/or configured to perform tasks involving coordination, scheduling, arbitration, supervising, controlling, or otherwise managing operation of controller(s) 60, for example, scheduling execution of programs. Memory 62 may be or may include, for example, a Random-Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short-term memory unit, a long-term memory unit, or other suitable memory units or storage units. Memory 62 may be or may include a plurality of possibly different memory units. Memory 62 may store for example, instructions to carry out a method (e.g., code 64), and/or data such as user responses, interruptions, etc.

Executable code 64 may be any executable code, e.g., an application, a program, a process, task or script. Executable code 64 may be executed by controller 63 possibly under control of operating system 61. For example, executable code 64 may when executed cause the production or compilation of computer code, or application execution such as VR execution or inference, according to embodiments of the present invention. Executable code 64 may be code produced by methods described herein. For the various modules and functions described herein, one or more computing devices and/or components of controller(s) 60 may be used. Devices that include components similar or different to those included in controller(s) 60 may be used and may be connected to a network and used as a system. One or more processor(s) 63 may be configured to carry out embodiments of the present invention by for example executing software or code.

Storage 65 may be or may include, for example, a hard disk drive, a floppy disk drive, a Compact Disk (CD) drive, a CD-Recordable (CD-R) drive, a universal serial bus (USB) device or other suitable removable and/or fixed storage unit. Data such as instructions, code, VR model data, parameters, etc. may be stored in a storage 65 and may be loaded from storage 65 into a memory 62 where it may be processed by controller 63. In some embodiments, some of the components shown in FIG. 4 may be omitted.

Input devices 66 may be or may include for example a mouse, a keyboard, a touch screen or pad or any suitable input device. It will be recognized that any suitable number of input devices may be operatively connected to controller(s) 60 as shown by block 66. Output devices 67 may include one or more displays, speakers and/or any other suitable output devices. It will be recognized that any suitable number of output devices may be operatively connected to controller(s) 60 as shown by block 67. Any applicable input/output (I/O) devices may be connected to controller(s) 60, for example, a wired or wireless network interface card (NIC), a modem, printer or facsimile machine, a universal serial bus (USB) device or external hard drive may be included in input devices 66 and/or output devices 67.

Embodiments of the invention may include one or more article(s) (e.g., memory 62 or storage 65) such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein.

Aspects of the present invention are described above with reference to flowchart illustrations and/or portion diagrams of methods, apparatus (systems) and computer program products according to embodiments of the invention. It will be understood that each portion of the flowchart illustrations and/or portion diagrams, and combinations of portions in the flowchart illustrations and/or portion diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or portion diagram or portions thereof.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or portion diagram or portions thereof.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or portion diagram or portions thereof.

The aforementioned flowchart and diagrams illustrate the architecture, functionality, and operation of possible implementations of systems, methods and computer program products according to various embodiments of the present invention. In this regard, each portion in the flowchart or portion diagrams may represent a module, segment, or portion of code, which comprises one or more executable instructions for implementing the specified logical function(s). It should also be noted that, in some alternative implementations, the functions noted in the portion may occur out of the order noted in the figures. For example, two portions shown in succession may, in fact, be executed substantially concurrently, or the portions may sometimes be executed in the reverse order, depending upon the functionality involved. It will also be noted that each portion of the portion diagrams and/or flowchart illustration, and combinations of portions in the portion diagrams and/or flowchart illustration, can be implemented by special purpose hardware-based systems that perform the specified functions or acts, or combinations of special purpose hardware and computer instructions.

In the above description, an embodiment is an example or implementation of the invention. The various appearances of "one embodiment", "an embodiment", "certain embodiments" or "some embodiments" do not necessarily all refer to the same embodiments. Although various features of the invention may be described in the context of a single embodiment, the features may also be provided separately or in any suitable combination. Conversely, although the invention may be described herein in the context of separate embodiments for clarity, the invention may also be implemented in a single embodiment. Certain embodiments of the invention may include features from different embodiments disclosed above, and certain embodiments may incorporate elements from other embodiments disclosed above. The disclosure of elements of the invention in the context of a specific embodiment is not to be taken as limiting their use in the specific embodiment alone. Furthermore, it is to be understood that the invention can be carried out or practiced in various ways and that the invention can be implemented in certain embodiments other than the ones outlined in the description above.

The invention is not limited to those diagrams or to the corresponding descriptions. For example, flow need not move through each illustrated box or state, or in exactly the same order as illustrated and described. Meanings of technical and scientific terms used herein are to be commonly understood as by one of ordinary skill in the art to which the invention belongs, unless otherwise defined. While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

What is claimed is:

1. A method of inspecting a product made by additive manufacturing (AM) of multiple layers, the method comprising:
    deriving an augmented file, from a design file including layer data used to produce the product by AM, wherein for each design layer, the augmented file includes the layer data for said design layer and weighted layer data for design layers beneath said design layer, and
    applying a machine learning (ML) algorithm with respect to the derived augmented file—onto received optical inspection images of the product during the AM process to detect production errors,
    wherein the ML algorithm is trained using a plurality of augmented files and corresponding optical inspection images—to adjust the weights so that production errors in each produced layer are detected irrespective of signals from the produced layers beneath said produced layer.

2. The method of claim 1, wherein the ML algorithm is a deep learning algorithm.

3. The method of claim 1, wherein the weights decrease with designed layer depth.

4. The method of claim 1, wherein the augmented file includes the weighted layer data with decreasing darkness and/or contrast for design layers deeper below said design layer.

5. The method of claim 1, wherein the detection of production errors includes detection of shifting of openings through two or more layers.

6. The method of claim 1, wherein the product includes at least one semi-transparent portion.

7. The method of claim 1, wherein the product is an electronic device that includes patterned conductive material and semi-transparent insulating material.

8. The method of claim 1, wherein the product is a non-conductive semi-transparent model.

9. A computer program product comprising a non-transitory computer readable storage medium having computer readable program embodied therewith and configured to carry out at least partially the method of claim 1.

10. A computer program product comprising a non-transitory computer readable storage medium having computer readable program embodied therewith, the computer readable program comprising:
    computer readable program configured to derive an augmented file, from a design file including layer data used to produce a product made by additive manufacturing (AM) of multiple layers, wherein for each design layer, the augmented file includes the layer data for said design layer and weighted layer data for design layers beneath said design layer, and
    computer readable program configured to apply a machine learning (ML) algorithm with respect to the derived augmented file—onto received optical inspection images of the product during the AM process to detect production errors,
    wherein the ML algorithm is trained using a plurality of augmented files and corresponding optical inspection images—to adjust the weights so that production errors in each produced layer are detected irrespective of signals from the produced layers beneath said produced layer.

11. A computer program product comprising a non-transitory computer readable storage medium having computer readable program embodied therewith, the computer readable program comprising:
    computer readable program configured to apply a machine learning (ML) algorithm with respect to a derived augmented file, the augmented file derived from a design file including layer data used to produce a product made by additive manufacturing (AM) of multiple layers, wherein for each design layer, the augmented file includes the layer data for said design layer and weighted layer data for design layers beneath said design layer—onto received optical inspection images of the product during the AM process to detect production errors,
    wherein the ML algorithm is trained using a plurality of augmented files and corresponding optical inspection images—to adjust the weights so that production errors in each produced layer are detected irrespective of signals from the produced layers beneath said produced layer.

12. An inspection module in an additive manufacturing (AM) system, the inspection module comprising the computer program product of claim 11.

* * * * *